INVENTORS
WILLIAM H. BENSON
BY THOMAS H. FALCONER

ELECTRODYNAMIC SEPARATOR

INVENTORS
WILLIAM H. BENSON
THOMAS H. FALCONER

United States Patent Office 3,448,857
Patented June 10, 1969

3,448,857
ELECTRODYNAMIC SEPARATOR
William H. Benson and Thomas H. Falconer, Erie, Pa., assignors to Eriez Magnetics, Erie, Pa., a corporation of Pennsylvania
Filed Oct. 24, 1966, Ser. No. 588,969
Int. Cl. B03c 1/02
U.S. Cl. 209—212                             3 Claims

ABSTRACT OF THE DISCLOSURE

A magnetic separator disclosed herein utilizes a repulsion type principle for separating particles of greater conductivity from particles of less electrical conductivity. The separator is made up of a conveyor belt for carrying materials to be separated. The conveyor belt moves the material past a field which moves at high velocity through the belt and through the material thereby causing the particles of greater conductivity to be projected into a first repository and the particles of lesser conductivity to be projected into a second repository.

---

This invention relates to the separation and classification of electrically conductive material, and, more particularly, to apparatus which employs electromotive excitation as a prime activator in the separation and classification of conducting particles.

In the field of metal separation, the successes achieved thus far have been confined almost entirely to the separation of ferrous metal particles by means of simple magnetic attraction. The invention, as described herein, makes use of the principles of electromagnetic repulsion, and its use is not confined to the separation of ferrous particles but will work to a varying degree on any material that has the ability to conduct an electric current. The force with which any conducting body is repelled will depend in part upon the degree of electrical conductance of the material, and from this it will be seen that in at least some cases a mixture of materials may be separated from each other in the order of their electrical conductivity.

The invention in one of its several forms is based upon periodic high energy discharges (such as from an energy discharge capacitor) into a specially designed air-core coil which is the working element of the separator. Energy stored in the capacitor and discharged into the low-impedance coil produces an extremely fast buildup of the magnetic field threading the coil. This high rate of flux change produces by induction in a conducting body held near the face of the coil, eddy currents whose values are in accordance with Ohms law, $I = E/R$, where I is the eddy current value, E is the voltage induced by the expanding field cutting the eddy current path, and R is the electrical resistance of the path. From this it is seen that conductors having the least R (greatest conductance) will support the greatest eddy currents and therefore the most intense magnetic fields about the eddy current paths.

In accordance with Lenz's law, the flux about the eddy current paths is opposite in direction to that about the eddy current paths is opposite in direction to that about the coil, and the conducting body is therefore repelled away from the coil face, the repelling force depending upon the strengths of the two fields. For a given intensity of coil flux, the force will depend upon the eddy current value, which will, in turn, depend upon the electrical conductance of the body.

Further, the amount of force required to move a given electrical conductor through a given magnetic field at a given velocity, and initiate and maintain a voltage in and a flow of current through a circuit of which the conductor is a part, depends upon the resistance of the circuit; that is, the lower the resistance the greater the force required. This is true because current flowing in any circuit having resistance produces an energy loss equal to the current squared times the resistance, and it follows that the lower the resistance, the greater the energy loss and the greater the amount of work needed to move the conductor and supply the loss.

In accordance with this principle and with the fact that conducting bodies contain within themselves an infinite number of closed conduction paths or circuits, if a discrete part or particle of a good conducting material is moved with some velocity into an intense unidirectional magnetic field, the force required to maintain the movement is greater than that required for a lesser conductor.

In one of the forms of the new electrodynamic separator a mixture of discrete parts or particles with various electrical conductivity characteristics may be projected through an intense unidirectional field at high velocity with the line of motion of the particles essentially at 90° with the direction of the field and, in accordance with the above mentioned principles, particles of greater conductivity will be decelerated to a greater extent than those of lesser conductivity, with the result that different kinds of particles will have different trajectories in emerging from the field, and separation of the particles will thereby be achieved. It will be understood that the effect on the conducting particles will be the same whether the particles move with respect to the field or whether the field moves with respect to the particles.

The foregoing basic principles are well known and some have been utilized to a considerable extent in such things as magnetic metal forming. It is believed that my invention is unique in that these principles are now applied to the separation of metals by these forces of repulsion.

It is, accordingly, an object of the invention to provide an improved magnetic repulsion separator.

Another object of the invention is to provide a magnetic repulsion separator which is simple in construction, economical to manufacture, and simple and efficient to use.

Another object of the invention is to provide a magnetic repulsion separator, wherein the separation and classification of conducting particles is achieved by flowing the materials through a cyclic magnetic field in a manner which effectively takes advantage of the varying conduction characteristics of the particles to effect a separation of the greater electrical conducting materials from the lesser conducting materials.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
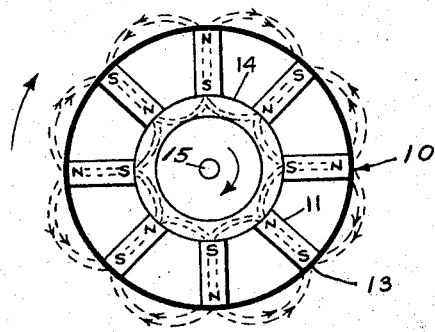
FIG. 1 is an end view of a magnetic drum for use in the process according to the invention.
Figure 2:
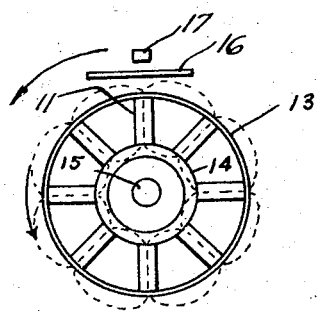
FIG. 2 is an end view of the drum of FIG. 1, showing it supported adjacent to a conveyor belt.
Figure 3:
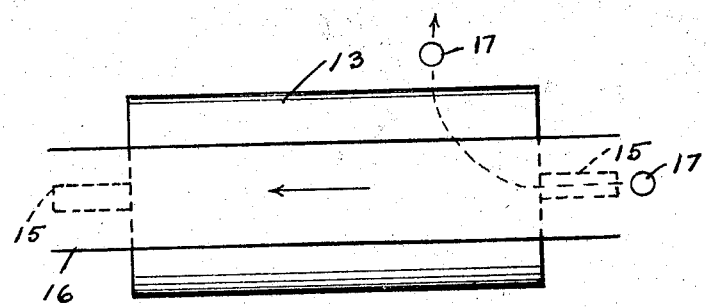
FIG. 3 is a top view of the drum and belt.

Now with more particular reference to the drawings, and particularly the embodiment of the invention shown in FIGS. 1, 2, and 3, a magnetic drum 10 is shown which is supported on axle 15 and hub 14 on a suitable bearing arrangement. The drum 10 has an outer shell 13 which is preferably made of non-magnetic material. The bar-shaped magnets 11 have their inner ends supported on a magnetic hub member 14 and their outer ends supported on the inside of the shell 13. Thus, the magnetic fields from the magnet are in the dotted line relation when the magnets are arranged with polarity as indicated in FIG. 1.

The conveyor belt indicated at 16 moves in a direction parallel to the axle 15 so that the material on the belt is moved through the fields created by the magnets 11. Thus, when the drum 10 is rotated at a high speed, eddy current voltages induced in the particles 17 will produce eddy currents in them, which will cause them to move as shown in the dotted line path.

Figure 4:
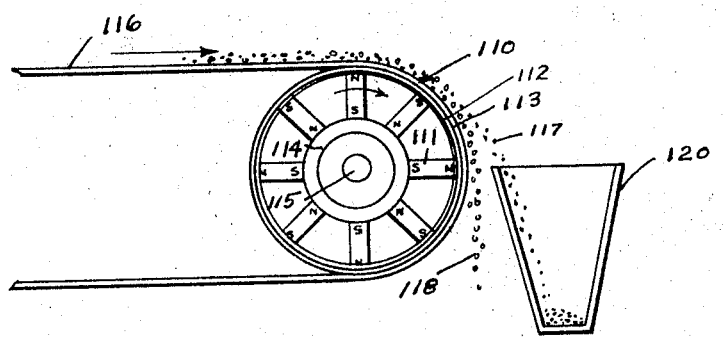
FIG. 4 is a side view of another embodiment of the invention.

In the embodiment of the invention shown in FIG. 4, a belt 116 which carries particles 117 and 118 having different electrical conductivity characteristics is supported on a suitable pulley 112. A magnetic drum 110, which may be constructed in the manner shown in FIG. 1, is rotated at high speed, for example, at 3,600 r.p.m., inside the pulley in the direction shown. Thus, when the belt is driven at, for example, 60 feet per minute, there is a relative motion between the belt and the pulley, and the speed differential causes the magnetic lines of force to cut through the particles causing currents to be induced into the particles according to the principles set forth in this application. Thus, the more conductive particles 117 will have higher currents than the less conductive particles and they will then be forced to follow a trajectory into the receptacle 120, while those with lesser electrical conductivity indicated at 118 will because to move in a trajectory that will cause them to fall short of the container 120.

Figure 5:
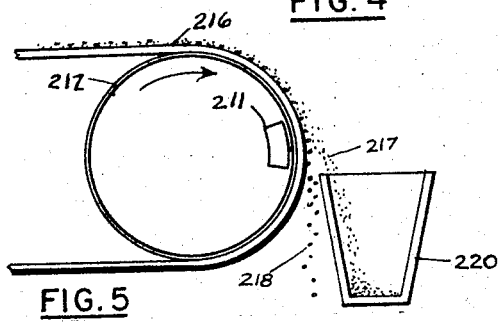
FIG. 5 is an end view of yet another embodiment of the invention.

In the embodiment of the invention shown in FIG. 5, a conveyor belt 216 is supported on a pulley 212, and an electrical repulsion coil assembly 211 is fixed in a position such that the pulley rotates around it. In effect it is on the inside of the pulley. Thus, the particles that move along the belt 216 move across the face of the electrical repulsion coil assembly 211, and as the repulsion coil exerts its greater outward pressure on the more conducting particles, there will follow a trajectory into the receptacle 220, while those particles with lesser electrical conductivity indicated at 218 will move in a trajectory such as to cause them to fall short of the container 220.

It will be understood that the embodiment of FIG. 5 is only intended to be representative of the several ways that the necessary movement of the material across the repulsion coil face can be accomplished. Among these are (1) an inclined belt supported at a high and at a low point by two pulleys, the belt sliding over the inclined repulsion coil face between the two pulleys; and (2) simple sliding of the material across the inclined open face of repulsion coil assembly, the material being fed by such a device as a vibratory bulk feeder.

Figure 6:
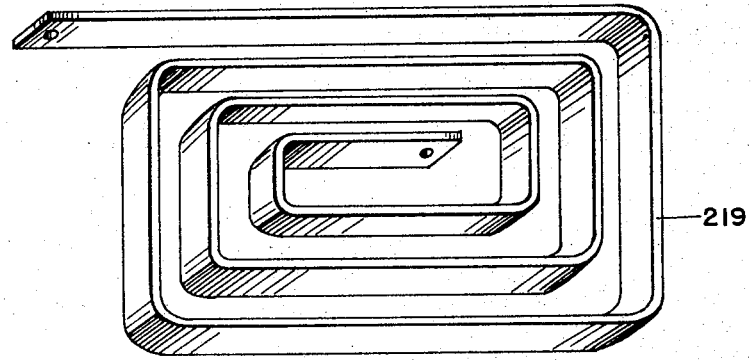
FIG. 6 is a view of a flat spirally-wound electrical coil which is part of the embodiment of FIG. 5.

The embodiment of FIG. 6 shows a view of the repulsion coil 219 which is part of the electrical repulsion coil assembly 211. In the assembly, one flat face of the spirally wound repulsion coil is so arranged that it is in a plane parallel to that of the moving material and as close to the moving material as physically possible.

Figure 7:
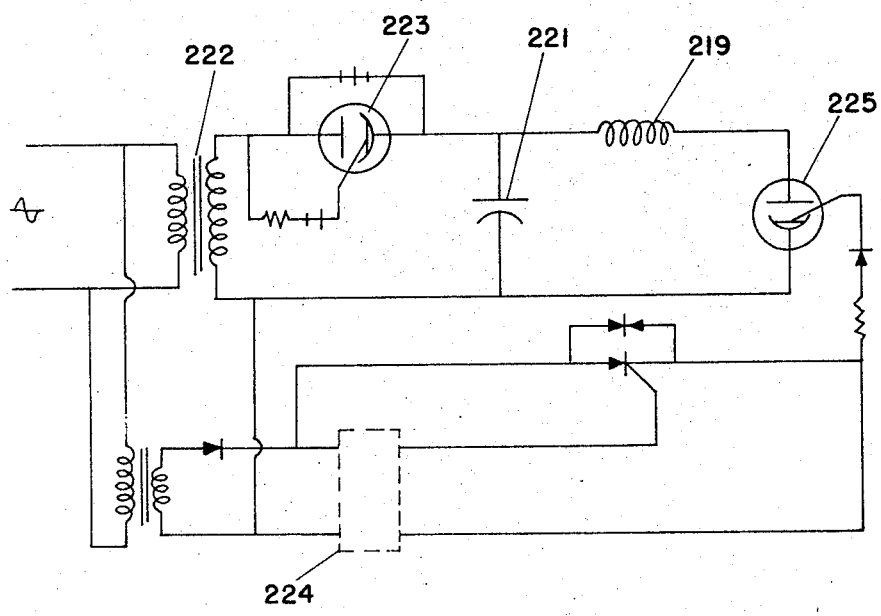
FIG. 7 is a view of an electrical control circuit for the embodiment of FIG. 5.

The embodiment of FIG. 7 shows an electrical circuit for producing the necessary periodic current discharges through the coil 219. In this circuit, capacitor 221 is charged by a rectified half-wave pulse from an alternating current source through transformer 222 and half-wave controlled rectifier 223. At a time in the charging cycle determined by the phase-shifted pulse circuit 224, the half-wave controlled rectifier 225 is fired by a pulse from the pulse circuit, and the capacitor 221 is discharged through coil 219 and rectifier 225. This action is repeated at the source frequency rate, resulting in a continuous series of fast-changing flux pulses through and about coil 219. These high-gradient flux pulses induce in the conducting particles near the working face of coil 219 the eddy currents necessary for repulsion of the conducting particles from the coil.

Figure 8:
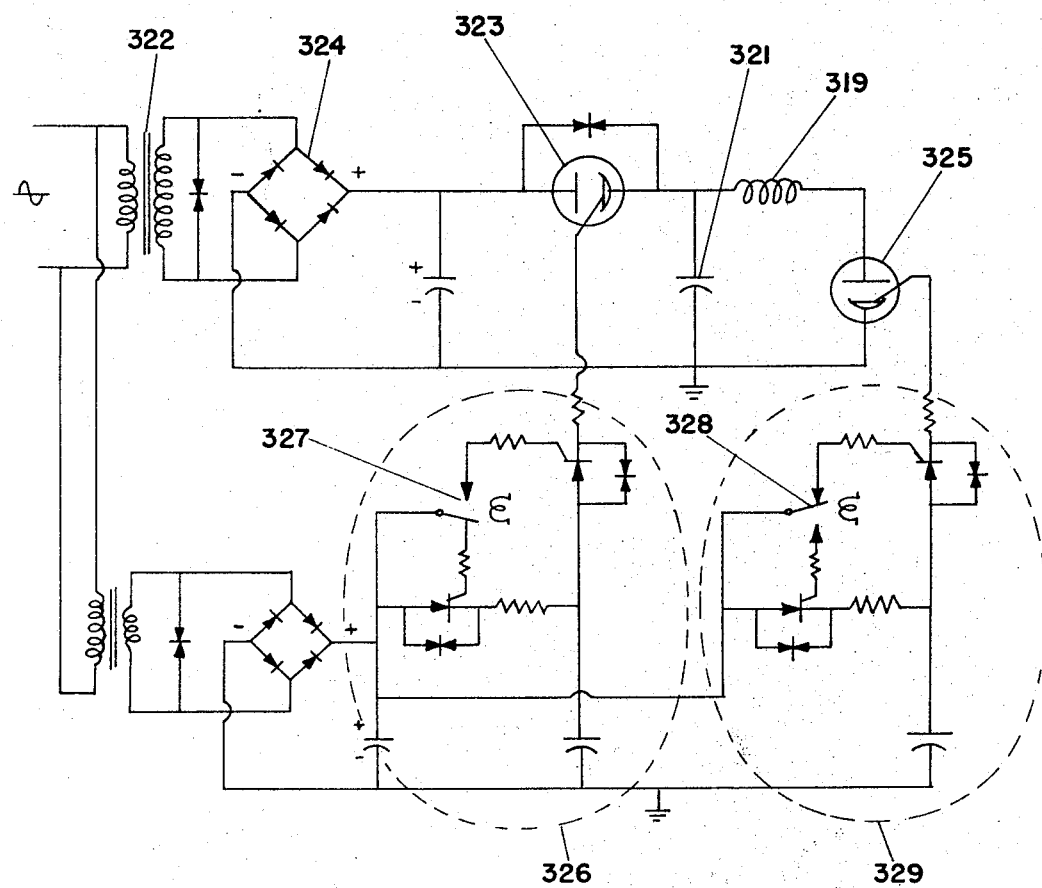
FIG. 8 is a view of another electrical control circuit for the embodiment of FIG. 5.
Figure 9:
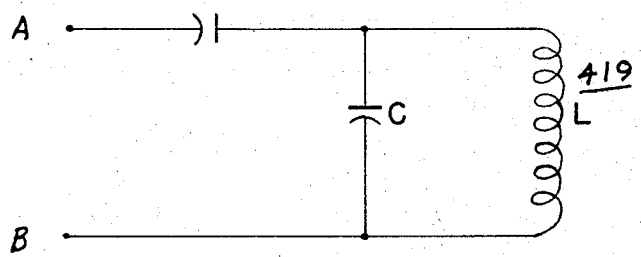
FIG. 9 shows the working coil of another embodiment of the invention connected in a tank circuit.

The embodiment of FIG. 8 shows another electrical circuit for producing the periodic current discharges through coil 219. In this circuit, capacitor 321 is charged by a full-wave rectified current from an alternating current source through transformer 322, bridge rectifier 324, and half-wave controlled rectifier 323. The charging cycle is initiated by a voltage pulse from the switched pulse circuit 326. Subsequently, at a time determined by a multivibrator or other pulse circuit which alternatively drives contacts 327 and 328, a voltage pulse from switched pulse circuit 329 fires the half-wave controlled rectifier 325, and the capacitor 321 is discharged through coil 219 and rectifier 325. This action is repeated at a rate determined by the constants of the circuit and by the setting of the driving multivibrator or other pulse circuit, resulting in a continuous series of fast-changing flux pulses through and about coil 219. These high-gradient flux pulses induce in the conducting parts near the working face of coil 219 the eddy currents necessary for repulsion of the conducting particles from the coil.

The continuous sinusoidally varying current in the working coil 419 is similar to the working coil described elsewhere in the application and produces a similarly varying magnetic field about the working coil. Eddy currents thereby induced in conducting particles brought near the face of the coil produce an opposing magnetic field with the result that the conducting particles are repelled from the near vicinity of the coil. Current to the coil 419 can be supplied by the input from an oscillator tuned to the same frequency as the natural frequency of the tank circuit shown in FIG. 8. The oscillator will be connected to terminals A and B. The oscillator is used to make up the losses in the tank circuit and thus maintains the tank circuit oscillator.

The embodiments of the invention in which an exclusive property or privilege is claimed are defined as follows:

1. A magnetic repulsion separator machine adapted to separate a mixture of discrete particles having various electrical conductivity characteristics, some of said particles having greater conductivity and some particles of lesser conductivity, comprising a conveyor belt to carry said particles, means to provide a unidirectional magnetic field of high intensity, having lines of force disposed in a direction through said belt to said particles, first repository means on said machine and second repository means spaced from said first repository means on said machine, means to project said particles comprising means to move said field at high velocity through said particles whereby said particles of greater conductivity are projected into said first repository and said particles of lesser conductivity are projected into said second repository, said belt being supported on a drum and said field means being produced by a pulley having permanent magnets built into it with magnetic fields projecting radially from the periphery of said pulley.

2. A magnetic repulsion separator machine adapted to separate a mixture of discrete particles having various electrical conductivity characteristics, some of said particles having greater conductivity and some particles of lesser conductivity,
- comprising a conveyor belt to carry said particles,
- means to provide a unidirectional magnetic field of high intensity, having lines of force disposed in a direction through said belt to said particles,
- first repository means on said machine and second repository means spaced from said first repository means on said machine,
- means to project said particles comprising means to move said field at high velocity through said particles whereby said particles of greater conductivity are projected into said first repository and said particles of lesser conductivity are projected into said second repository,
- said belt being supported on a drum and said field means being produced by a pulley having permanent magnets built into it with magnetic fields projecting radially from the periphery of said pulley,
- said magnet pulley being rotated at a rapid speed relative to said belt.

3. A magnetic repulsion separator machine adapted to separate a mixture of discrete particles having various electrical conductivity characteristics, some of said particles having greater conductivity and some particles of lesser conductivity,
- comprising a conveyor belt to carry said particles,
- means to provide a unidirectional magnetic field of high intensity, having lines of force disposed in a direction through said belt to said particles,
- first repository means on said machine and second repository means spaced from said first repository means on said machine,
- means to project said particles comprising means to move said field at high velocity through said particles whereby said particles of greater conductivity are projected into said first repository and said particles of lesser conductivity are projected into said second repository,
- said conveyor belt passing over a repulsion coil assembly,
- said repulsion coil assembly being periodically actuated by electric current,
- said coil assembly having a coil therein,
- a condenser connected to said coil,
- means to periodically charge said condenser,
- and means to periodically discharge said condenser into said coil,
- said coil being made of specially wound air core coil having one flat side face,
- said flat face being arranged in a plane parallel to the plane through which said materials move.

References Cited

UNITED STATES PATENTS

| | | | |
|---|---|---|---|
| 400,317 | 3/1889 | Edison | 209—212 |
| 402,684 | 5/1889 | Maxim | 209—212 |
| 731,042 | 6/1903 | Gates | 209—212 |
| 1,214,817 | 2/1917 | Osgood | 209—212 |
| 1,416,634 | 5/1922 | Hall | 209—212 |
| 1,453,699 | 5/1923 | Brophy | 209—223.1 X |
| 1,729,008 | 9/1929 | Osborne et al. | 209—223.1 |
| 1,829,565 | 10/1931 | Lee | 209—212 |
| 2,048,316 | 7/1936 | Beatty | 209—212 X |
| 2,992,733 | 7/1961 | Buus et al. | 209—219 |

TIM R. MILES, *Primary Examiner.*